(12) United States Patent
Kaye et al.

(10) Patent No.: US 9,093,703 B2
(45) Date of Patent: Jul. 28, 2015

(54) HIGH ENERGY MATERIALS FOR A BATTERY AND METHODS FOR MAKING AND USE

(71) Applicant: Wildcat Discovery Technologies, Inc., San Diego, CA (US)

(72) Inventors: Steven Kaye, San Diego, CA (US); David Keogh, San Diego, CA (US); Cory O'Neill, San Diego, CA (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 0 days.

(21) Appl. No.: 14/220,058

(22) Filed: Mar. 19, 2014

(65) Prior Publication Data

US 2014/0272586 A1 Sep. 18, 2014

Related U.S. Application Data

(63) Continuation of application No. PCT/US2014/028506, filed on Mar. 14, 2014.

(60) Provisional application No. 61/786,602, filed on Mar. 15, 2013.

(51) Int. Cl.
*H01M 4/36* (2006.01)
*C04B 35/553* (2006.01)

(52) U.S. Cl.
CPC .............. *H01M 4/366* (2013.01); *C04B 35/553* (2013.01)

(58) Field of Classification Search
None
See application file for complete search history.

(56) References Cited

U.S. PATENT DOCUMENTS

| | | | |
|---|---|---|---|
| 5,378,560 | A | 1/1995 | Tomiyama |
| 6,346,349 | B1 | 2/2002 | Briscoe et al. |
| 6,613,213 | B1 | 9/2003 | Reilly et al. |
| 6,810,061 | B2 | 10/2004 | Hori et al. |
| 6,964,827 | B2 | 11/2005 | Barker et al. |
| 7,261,872 | B2 | 8/2007 | Greer |
| 7,371,338 | B2 | 5/2008 | Amatucci |
| 7,625,671 | B2 | 12/2009 | Amatucci |
| 7,947,392 | B2 | 5/2011 | Amatucci et al. |
| 8,039,149 | B2 | 10/2011 | Amatucci et al. |
| 8,257,866 | B2 | 9/2012 | Loveness et al. |
| 2003/0027049 | A1 | 2/2003 | Barker et al. |
| 2006/0019163 | A1 | 1/2006 | Amatucci et al. |
| 2006/0035148 | A1 | 2/2006 | Balaya et al. |

(Continued)

FOREIGN PATENT DOCUMENTS

| | | |
|---|---|---|
| CN | 101794877 A | 8/2010 |
| GB | 1383957 A | 2/1974 |

(Continued)

OTHER PUBLICATIONS

U.S. Appl. No. 13/831,924, filed Mar. 2013, Caldwell et al.*

(Continued)

*Primary Examiner* — Patrick Ryan
*Assistant Examiner* — Christopher Domone
(74) *Attorney, Agent, or Firm* — Corridor Law Group, P.C.

(57) ABSTRACT

A method of forming an electrode active material by reacting a metal fluoride and a reactant. The reactant can be a metal oxide, metal phosphate, metal fluoride, or a precursors expected to decompose to oxides. The method includes a milling step and an annealing step. The method can alternately include a solution coating step. Also included is the composition formed following the method.

12 Claims, 19 Drawing Sheets

(56) References Cited

U.S. PATENT DOCUMENTS

| | | |
|---|---|---|
| 2007/0243466 A1 | 10/2007 | Amatucci et al. |
| 2007/0285498 A1 | 12/2007 | Shiomi |
| 2008/0199772 A1* | 8/2008 | Amatucci et al. ............. 429/188 |
| 2009/0186276 A1* | 7/2009 | Zhamu et al. ................. 429/221 |
| 2011/0229761 A1 | 9/2011 | Cui et al. |
| 2013/0065126 A1 | 3/2013 | Caldwell et al. |

FOREIGN PATENT DOCUMENTS

| | | |
|---|---|---|
| KR | 1020060109305 A | 10/2006 |
| KR | 1020070117826 A | 12/2007 |
| WO | 2004034489 A | 4/2004 |
| WO | 2004051772 A | 6/2004 |
| WO | 2008100002 A1 | 8/2008 |

OTHER PUBLICATIONS http://www.merriam-webster.com/dictionary/coating. Dec. 2014.*

Badway et al, High-Capacity Reversible Metal Fluoride Conversion Materials as Rechargeable Positive Electrodes for Li Batteries, Journal of the Electrochemical Society, 150, 10, A1318-A1327, 2003.

Badway et al, Next Generation Positive Electrode Materials Enabled by Nanocomposites:—Metal Fluorides—, MRS Proceedings. vol. 756. No. 1. Cambridge University Press, 2002.

Badway et al, Structure and Electrochemistry of Copper Fluoride Nanocomposites Utilizing Mixed Conducting Matrices, Chem. Mater. 2007, 19, 4129-4141.

International Search Report and Written Opinion for PCT/US2014/028271 dated Aug. 11, 2014.

International Search Report for PCT/US2014/028478 Aug. 14, 2014.

International Search Report for PCT/US2014/028506 Jul. 25, 2014.

Liu, Li et al., "Excellent cycle performance of Co-doped FeF3/C nanocomposite cathode material for lithium-ion batteries," J. Mater. Chem., 2012, 22, 17539.

Liu, Xiu-Ming et al., "Effects of MoO3 encapsulating on performances of CuF2 cathode material for application of lithium primary batteries," The Chinese Journal of Nonferrous Metals, Feb. 2010, vol. 20 No. 2, 288-292.

Mansour, A.N. et al., "In situ X-ray absorption spectroscopic investigation of the electrochemical conversion reactions of CuF2—MoO3 nano composite," Journal of Solid State Chemistry 183 (2010) 3029-3038; Oct. 8, 2010.

* cited by examiner

HIGH ENERGY MATERIALS FOR A BATTERY AND METHODS FOR MAKING AND USE

CROSS-REFERENCE TO RELATED APPLICATIONS

This application is a continuation of International Application No. PCT/US2014/028506, having an international filing date of Mar. 14, 2014 entitled "High Energy Materials For A Battery And Methods For Making And Use," which claims priority to U.S. Provisional Application No. 61/786,602 filed Mar. 15, 2013 entitled "High Energy Materials For A Battery And Methods For Making And Use." This application claims priority to and the benefit of each of these applications, and each application is incorporated herein by reference in its entirety.

BACKGROUND OF THE INVENTION

The present invention is in the field of battery technology, and more particularly in the area of materials for making high-energy electrodes for batteries, including metal-fluoride materials.

One type of battery consists of a negative electrode made primarily from lithium and a positive electrode made primarily from a compound containing a metal and fluorine. During discharge, lithium ions and electrons are generated from oxidation of the negative electrode while fluoride ions are produced from reduction of the positive electrode. The generated fluoride ions react with lithium ions near the positive electrode to produce a compound containing lithium and fluorine, which may deposit at the positive electrode surface.

Metal fluoride based batteries are an attractive energy storage technology because of their extremely high theoretical energy densities. For example, certain metal fluoride active materials can have theoretical energy densities greater than about 1600 Wh/kg or greater than about 7500 Wh/L. Further, metal fluorides have a relatively low raw material cost, for example less than about $10/kg. However, a number of technical challenges currently limit their widespread use and realization of their performance potential.

One challenge for certain metal fluoride materials is comparatively poor rate performance. Many metal fluoride active materials have electrochemical potentials greater than about 2.5 V because of their relatively large bandgap produced by the highly ionic bonding between the metal and fluorine, and in particular between a transition metal and fluorine. Unfortunately, one of the drawbacks to wide bandgap materials is the intrinsically low electronic conductivity that results from the wide bandgap. As a result of this low conductivity, discharge rates of less than 0.1 C are required in order to obtain full theoretical capacity. More typically, discharge rates of 0.05 C to 0.02 C are reported in the literature. Such low discharge rates limit the widespread use of metal fluoride active materials.

Another challenge for certain metal fluoride active materials is a significant hysteresis observed between the charge and discharge voltages during cycling. This hysteresis is typically on the order of about 1.0V to about 1.5V. While the origin of this hysteresis is uncertain, current evidence suggests that kinetic limitations imposed by low conductivity play an important role. Further, asymmetry in the reaction paths upon charge and discharge may also play a role. Since the electrochemical potential for many of the metal fluorides is on the order of 3.0V, this hysteresis of about 1.0V to about 1.5V limits the overall energy efficiency to approximately 50%.

Limited cycle life is another challenge for certain metal fluoride active materials. Although rechargeability has been demonstrated for many metal fluoride active materials, their cycle life is typically limited to tens of cycles and is also subject to rapid capacity fade. Three mechanisms are currently believed to limit the cycle life for the metal fluoride active materials: agglomeration of metallic nanoparticles and mechanical stress due to volume expansion. It is believed that metal fluoride active materials can cycle by virtue of the formation during lithiation of a continuous metallic network within a matrix of insulating LiF. As the number of cycles increases, the metal particles tend to accumulate together into larger, discrete particles. The larger agglomerated particles in turn create islands that are electrically disconnected from one another, thus reducing the capacity and ability to cycle the metal fluoride active materials. The second limitation to extended cycle life is the mechanical stress imparted to the binder materials by the metal fluoride particles as a result of the volume expansion that occurs during the conversion reaction. Over time, the binder is pulverized, compromising the integrity of the cathode. Notably, for the metal fluoride $CuF_2$, no demonstrations of rechargeability have been reported.

For $CuF_2$, an additional challenge prevents rechargeability. The potential required to recharge a $CuF_2$ electrode is 3.55V. However, in typical electrolytes for lithium ion batteries, Cu metal oxidizes to $Cu^{2+}$ at approximately 3.4 V vs. Li/Li$^+$. The oxidized copper can migrate to the anode, where it is irreversibly reduced back to Cu metal. As a result, Cu dissolution competes with the recharge of Cu+2LiF to $CuF_2$, preventing cycling of the cell. The Cu metal accumulating on the anode surface can increase the impedance and/or destroy the solid-electrolyte interphase (SEI) on the anode.

The following papers and patents are among the published literature on metal fluorides that employ mixed conductors that are not electrochemically active within the voltage window of the metal fluoride: Badway, F. et al., *Chem. Mater.*, 2007, 19, 4129; Badway, F. et al., *J. Electrochem. Soc.* 2007, 150, A1318; "Bismuth fluoride based nanocomposites as electrode materials" U.S. Pat. No. 7,947,392; "Metal Fluoride And Phosphate Nanocomposites As Electrode Materials" US 2008/0199772; "Copper fluoride based nanocomposites as electrode materials" US 2006/0019163; and "Bismuth oxyfluoride based nanocomposites as electrode materials" U.S. Pat. No. 8,039,149.

Certain embodiments of the present invention can be used to form electrochemical cells having metal fluoride active material that exhibit improved rate performance, improved energy efficiency, and improved cycle life when compared to prior batteries. Thus, these and other challenges can be addressed by embodiments of the present invention described below.

BRIEF SUMMARY OF THE INVENTION

Certain embodiments of the invention include a method of making a composition for use in forming a cathode for a battery. The method includes milling a metal fluoride material with a metal complex and annealing the mixture, wherein at least a portion of the metal fluoride material and at least a portion of the metal complex undergo a phase change. The method can include forming a coating on at least a portion of the metal fluoride material. The metal fluoride material is preferably $CuF_2$. The metal complex can be a metal oxide selected from the group consisting of $Al_2O_3$, $SiO_2$, $MoO_3$, $MoO_2$, NiO, CuO, $VO_2$, $V_2O_5$, $TiO_2$. Preferably, the metal oxide is NiO. The annealing temperature is less than 450 degrees C., less than 400 degrees C., less than 325 degrees C., or less than 200 degrees C. Preferably, the annealing temperature is about 325 degrees C. The temperature is chosen such that it is sufficiently high for the metal complex to react with the metal fluoride, but not high enough to decompose the metal fluoride. Without such heat treatment and the resulting reaction, the material is not rechargeable, as is demonstrated by experiments described herein.

Certain embodiments of the invention include a composition formed by the methods disclosed herein. The composition is characterized by having reversible capacity. The composition can include particles with a grain size greater than 100 nm, 110 nm, 120 nm, or 130 nm. The composition can include a particle having a first phase and a coating on the particle having a second phase. Preferably, the first phase includes the metal fluoride and the second phase includes the metal oxide. The coating can be covalently bonded to the particle.

Certain embodiments of the invention include batteries having electrodes formed from the compositions disclosed herein, the method of making such batteries, and the method of use of such batteries.

DETAILED DESCRIPTION OF THE INVENTION

Figure 1:
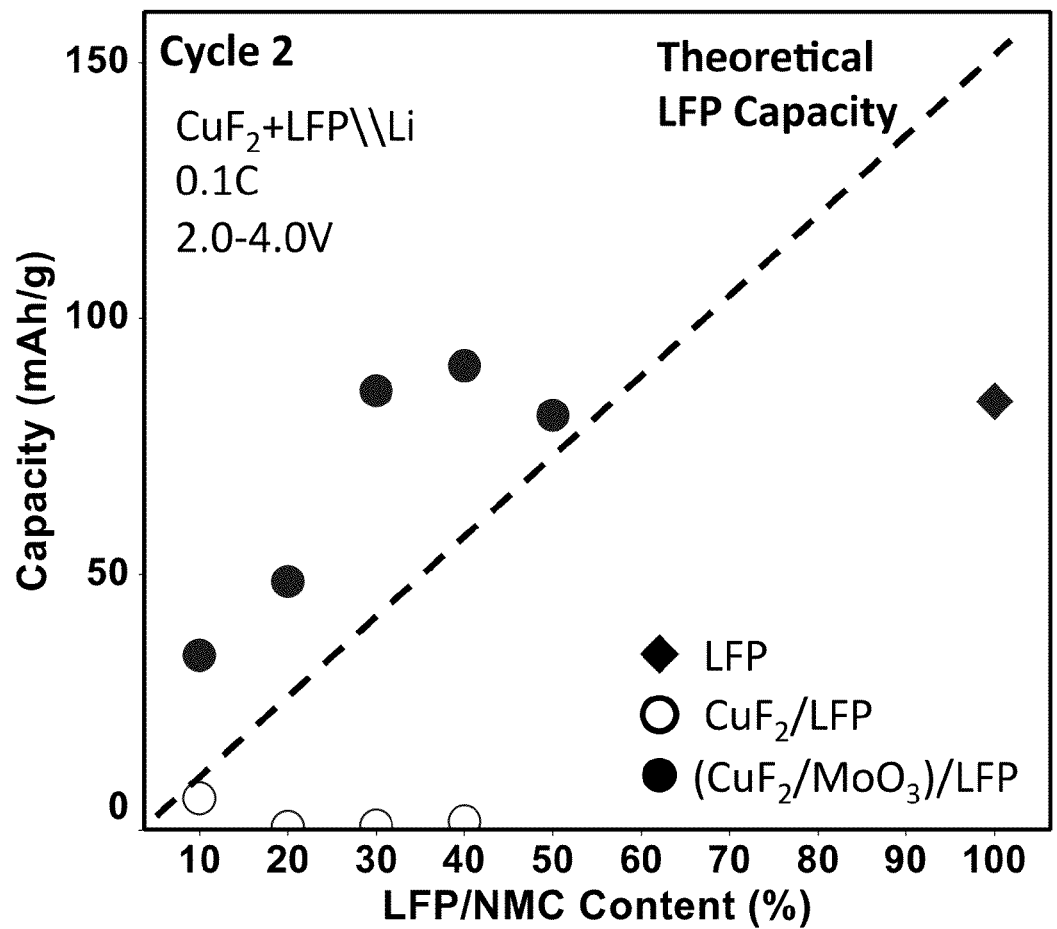
FIG. 1 illustrates electrochemical characterization of different hybrid cathode formulations according to embodiments of the invention in which the content of a conductive matrix material is varied in the cathode.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

The terms "conductive," "conductor," "conductivity," and the like refer to the intrinsic ability of a material to facilitate electron or ion transport and the process of doing the same. The terms include materials whose ability to conduct electricity may be less than typically suitable for conventional electronics applications but still greater than an electrically-insulating material.

The term "active material" and the like refers to the material in an electrode, particularly in a cathode, that donates, liberates, or otherwise supplies the conductive species during an electrochemical reaction in an electrochemical cell.

The term "transition metal" refers to a chemical element in groups 3 through 12 of the periodic table, including scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), and meitnerium (Mt).

The term "halogen" refers to any of the chemical elements in group 17 of the periodic table, including fluorine (F), chlorine (Cl), bromine (Br), iodine (I), and astatine (At).

The term "chalcogen" refers to any of chemical elements in group 16 of the periodic table, including oxygen (O), sulfur (S), selenium (Se), tellurium (Te), and polonium (Po).

The term "alkali metal" refers to any of the chemical elements in group 1 of the periodic table, including lithium (Li), sodium (Na), potassium (K), rubidium (Rb), cesium (Cs), and francium (Fr).

The term "alkaline earth metals" refers to any of the chemical elements in group 2 of the periodic table, including beryllium (Be), magnesium (Mg), calcium (Ca), strontium (Sr), barium (Ba), and radium (Ra).

The term "rare earth element" refers to scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

In certain embodiments, a novel active material, which may be referred to as a matrix material or a coated material or a hybrid material, is prepared for use in a cathode with metal fluoride ($MeF_x$) active materials. In some embodiments, the novel active material is prepared by combining a metal fluoride and a metal complex, followed by heat treatment of the mixture under an inert atmosphere according to the Formula (I)

$$MeF_x + Me'_y X_z + \text{heat} \quad (I)$$

According to certain embodiments, the heat treatment of the metal fluoride and metal complex causes a reaction to form a new phase according to the formula (II)

$$MeF_x + Me'_y X_z \rightarrow Me_a Me'_b X_c F_d \quad (II)$$

where x, y, z, a, b, and c depend on the identity and valence of the Me, Me', and X. In some instances, $0<a\leq1$, $0<b\leq1$, $0\leq c\leq1$, and $0\leq d\leq1$. In other embodiments, the heat treatment causes the formation of covalent bonds between the metal fluoride and the metal complex, improving conductivity and passivating the surface.

Suitable metal complexes, which can act as precursors for the reaction described herein, for use in synthesizing the matrix, coating, or active material include, but are not limited to, $MoO_3$, $MoO_2$, NiO, CuO, $VO_2$, $V_2O_5$, $TiO_2$, $Al_2O_3$, $SiO_2$, $LiFePO_4$, $LiMe_T PO_4$ (where $Me_T$ is one or more transition metal(s)), metal phosphates, and combinations thereof. According to embodiments of the invention, these oxides can be used in Formula (I).

It is understood that the synthetic route for achieving the matrix, coating, hybrid, or active matrix material may vary, and other such synthetic routes are within the scope of the disclosure. The material can be represented by $Me_a Me'_b X_c F$ and in the examples herein is embodied by a $Cu_3 Mo_2 O_9$ matrix. Other matrices and coatings are within the scope of this disclosure. For example, $NiCuO_2$, $Ni_2 CuO_3$, and $Cu_3 TiO_4$.

The matrix and coating materials disclosed herein provide rechargeability to otherwise non-rechargeable metal fluoride matrix materials. Without being bound by a particular theory or mechanism of action, the rechargeability may be due to the electrochemical properties of the novel matrix, the coating of the metal fluoride to prevent copper dissolution, or a more intimate interface between the metal fluoride and the matrix material as a result of the heat treatment and reaction. Further, the novel matrix material may provide a kinetic barrier to the Cu dissolution reaction, or to similar dissolution reactions for other metal fluoride materials to the extent such dissolution reactions occur in the cycling of electrochemical cells.

In the case of oxide-based matrices (such matrices include those generated according to Formula II), intimate mixing of the metal fluoride and the metal complex (or other suitable precursor material) and moderate heat treatment can be used to generate rechargeable electrode materials. Other suitable precursors include materials that decompose to form metal oxides (and in particular, transition metal oxides) as opposed to using a metal oxide to directly react with the metal fluoride. Examples of such precursors include, but are not limited to, metal acetates, metal acetylacetonates, metal hydroxides, metal ethoxides, and other similar organo-metal complexes. In either event, the final rechargeable matrix material is not necessarily a pure oxide or a purely crystalline material. The reaction of Formula II predicts that there would not be a pure oxide or a purely crystalline material. In some instances, the metal oxide precursor or metal oxide material can form a coating, or at least a partial coating, on the metal fluoride active material. Without being bound by a particular theory or mechanism of action, the reaction of the metal oxide precursor or metal oxide material with the surface of the metal fluoride (and in particular copper fluoride) active material is important for generating a rechargeable electrode active material.

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Example 1

Fabrication of Matrix and/or Coated Electrodes for Rechargeable Cells

Materials and Synthetic Methods.

All reactions were prepared in a high purity argon filled glove box (M-Braun, $O_2$ and humidity contents <0.1 ppm). Unless otherwise specified, materials were obtained from commercial sources (e.g., Sigma-Aldrich, Advanced Research Chemicals Inc., Alfa Aesar, Strem) without further purification.

Preparation of $CuF_2$/Matrix.

Milling vessels were loaded with $CuF_2$ at from about 85 wt % to about 95 wt % and reactant (metal oxide or metal oxide precursor) at from about 5 wt % to about 15 wt %, and the vessels were sealed. The mixture was milled. After milling, samples were annealed at from about 200 degrees C. to about 575 degrees C. for 1 to 12 hours under flowing $N_2$. Specific matrix reactants were processed as described below.

Preparation of $CuF_2/Cu_3Mo_2O_9$.

Milling vessels were loaded with $CuF_2$ (85 wt %) and $MoO_3$ (15 wt %), sealed, and then milled. After milling, samples were annealed at 450 degrees C. for 6 hours under flowing $N_2$.

Preparation of $CuF_2$/NiO.

Milling vessels were loaded with $CuF_2$ (85 wt %) and NiO (15 wt %), sealed, and then milled. After milling, samples were annealed at 325 degrees C. for 6 hours under flowing $N_2$.

Preparation of $CuF_2$/Nickel(II) Acetylacetonate.

A fine dispersion of $CuF_2$ was prepared by milling in the presence of THF (40-120 mg $CuF_2$/mL THF). The dispersed sample was then added to a solution of Ni(AcAc)2 in THF such that Nickel(II) acetylacetonate accounted for 15 wt % of the solids in the solution. The solution was then agitated by either shaking, sonication, or low energy milling for from about 1 to about 12 hours. The solution was then dried at room temperature under vacuum and the resulting solid was annealed at 450 degrees C. for 6 hours under dry air.

Electrode Formulation.

Cathodes were prepared using a formulation composition of 80:15:5 (active material:binder:conductive additive) according to the following formulation method: 133 mg PVDF (Sigma Aldrich) and about 44 mg Super P Li (Timcal) was dissolved in 10 mL NMP (Sigma Aldrich) overnight. 70 mg of coated composite powder was added to 1 mL of this solution and stirred overnight. Films were cast by dropping about 70 µL of slurry onto stainless steel current collectors and drying at 150 degrees C. for about 1 hour. Dried films were allowed to cool, and were then pressed at 1 ton/$cm^2$. Electrodes were further dried at 150 degrees C. under vacuum for 12 hours before being brought into a glove box for battery assembly.

Example 2

Electrochemical Characterization of Electrochemical Cells Containing Rechargeable Electrodes All batteries were assembled in a high purity argon filled glove box (M-Braun, $O_2$ and humidity contents <0.1 ppm), unless otherwise specified. Cells were made using lithium as an anode, Celgard 2400 separator, and 90 µL of 1M $LiPF_6$ in 1:2 EC:EMC electrolyte. Electrodes and cells were electrochemically characterized at 30 degrees C. with a constant current C/50 charge and discharge rate between 4.0 V and 2.0 V. A 3 hour constant voltage step was used at the end of each charge. In some instances, cathodes were lithiated pressing lithium foil to the electrode in the presence of electrolyte (1M $LiPF_6$ in 1:2 EC:EMC) for about 15 minutes. The electrode was then rinsed with EMC and built into cells as described above, except graphite was used as the anode rather than lithium.

FIG. 1 illustrates the results of electrochemical characterization of certain embodiments disclosed herein. Specifically, the second cycle discharge capacity of three different cathode formulations containing a $LiFePO_4$ matrix is plotted as a function of $LiFePO_4$ content (labeled LFP) in the cathode in FIG. 1. The dotted line depicts the theoretical capacity of $LiFePO_4$. One cathode formulation is 100% $LiFePO_4$. Another cathode formulation is a combination of $CuF_2$ and $LiFePO_4$ in which the content of $LiFePO_4$ was varied from 10% to 50% of the total weight of conductive material. The third cathode formulation is a combination of $CuF_2$ and the conventional conductive oxide $MoO_3$ and $LiFePO_4$ in which the content of $LiFePO_4$ was varied from 10% to 50% of the total weight of conductive material. As this is second cycle data, FIG. 1 demonstrates that all of the $CuF_2/LiFePO_4$ matrices are rechargeable. In addition, the $(CuF_2/MoO_3)/LiFePO_4$ hybrid cathode containing 50% $LiFePO_4$ is also able to recharge. FIG. 1 further demonstrates a direct relationship between the capacity and the percent content of $LiFePO_4$.

Figure 2:
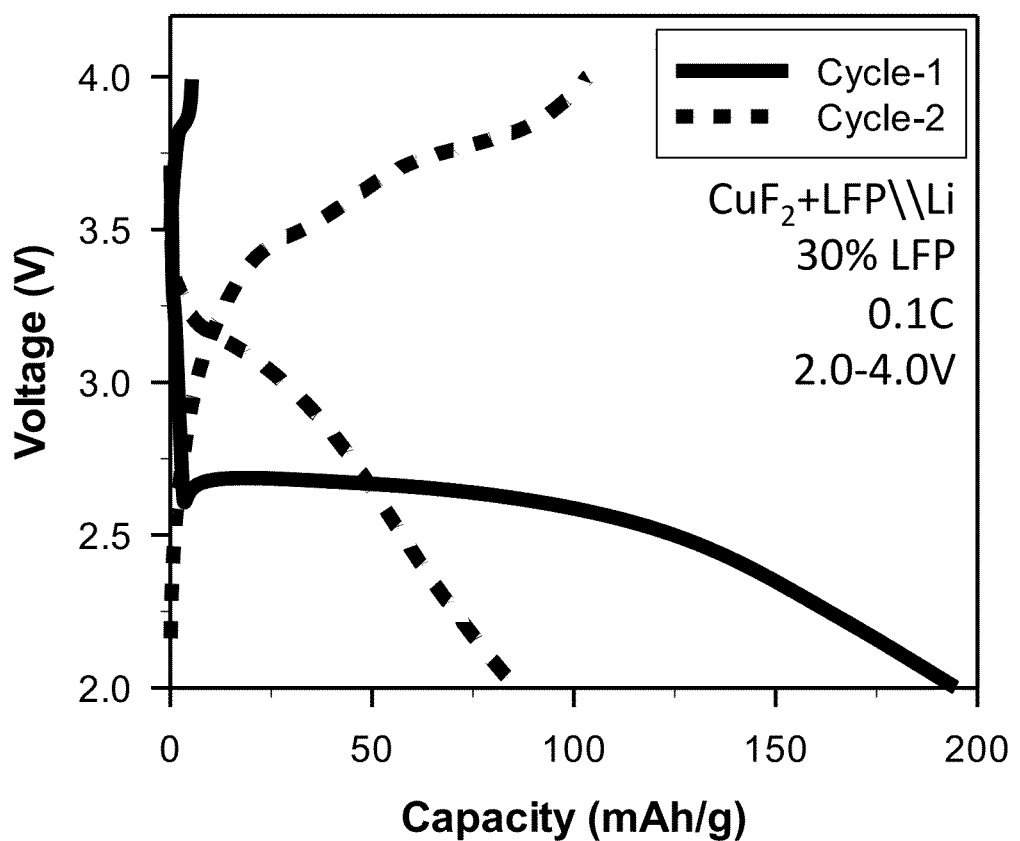
FIG. 2 illustrates electrochemical characterization of a cathode formulation from FIG. 1 in which the voltage of a hybrid cathode according to embodiments of the invention is plotted against the capacity for the first and second cycles.

FIG. 2 illustrates the results of electrochemical characterization of certain embodiments disclosed herein. Specifically, the voltage of a hybrid cathode is plotted against the capacity for the first and second cycles. The dashed line indicates the expected theoretical capacity from the $LiFePO_4$ content in cathode. The cathode formulation is the $CuF_2$ (70%)/ $LiFePO_4$ (30%) hybrid cathode from FIG. 1. During the first cycle, very little discharge capacity is observed, indicating that the $LiFePO_4$ material is not capable of accepting charge on this cycle. Without being bound to a particular theory or mechanism of action, the $LiFePO_4$ material may not accept charge as a result of defects introduced during milling. This data suggests that all of the capacity observed during the first and second cycles can be attributed solely to the $CuF_2$.

Figure 3:
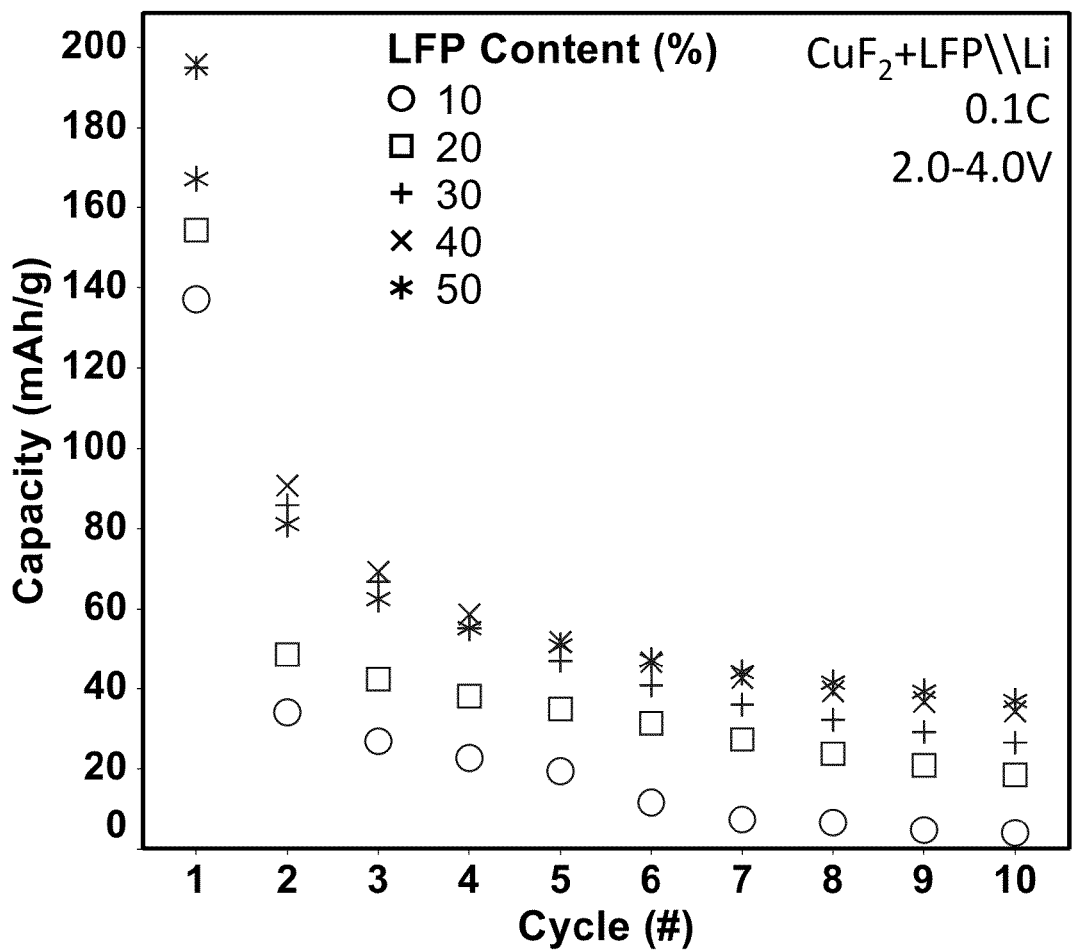
FIG. 3 illustrates electrochemical characterization of different hybrid cathode formulations according to embodiments of the invention in which the discharge is plotted as a function of cycle for 10 cycles.
Figure 4:
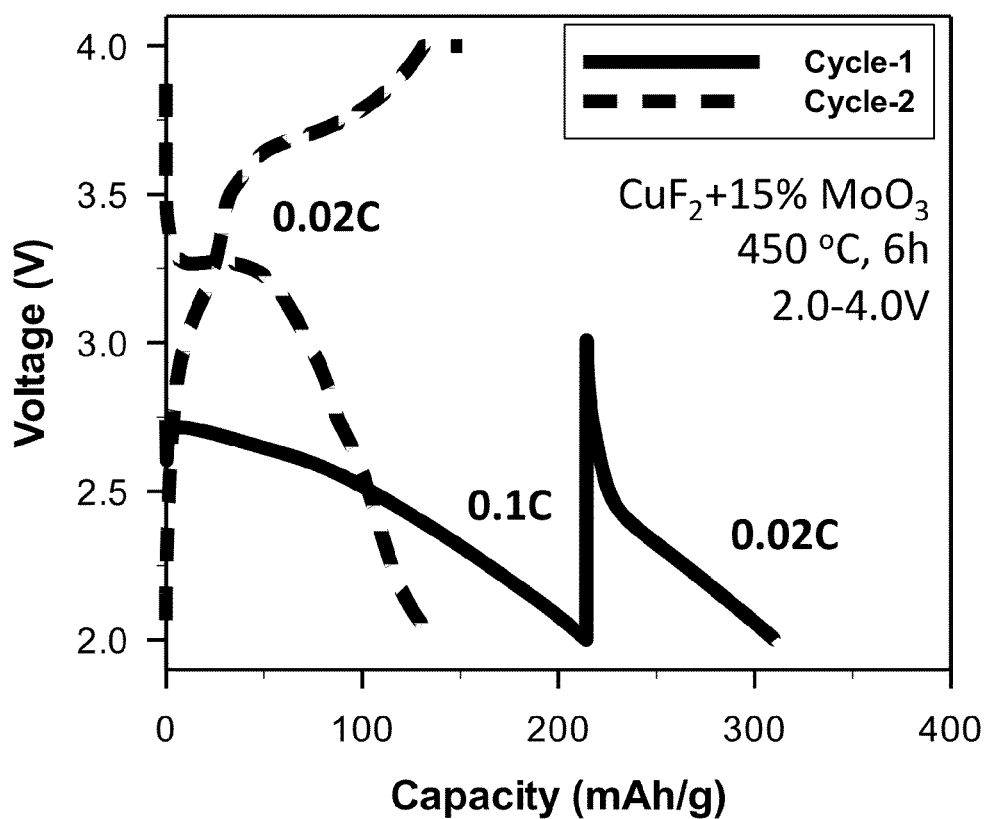
FIG. 4 illustrates electrochemical characterization of a hybrid cathode formed from a metal fluoride and a reactant material according to certain embodiments. The cathode demonstrates rechargeability.

FIG. 3 illustrates the results of electrochemical characterization of certain embodiments disclosed herein. Specifically, the discharge capacity for cells with a range of $LiFePO_4$ content is plotted as a function of cycle for 10 cycles. The cathode formulation is $CuF_2$ with $LiFePO_4$ content ranging from 10% to 50% of the total weight of conductive material. FIG. 4 demonstrates that the hybrid cathode is able to consistently recharge across a number of cycles. Based on data from FIG. 2, it is expected that the discharge capacity is contributed solely by $CuF_2$ and not $LiFePO_4$. This is a significant finding because $CuF_2$ has not been previously shown to have such significant reversible capacity. The combination of conductive matrix materials with $CuF_2$ renders the $CuF_2$ cathode material rechargeable.

FIG. 4 illustrates the results of electrochemical characterization of certain embodiments disclosed herein. Specifically, the first and second cycle voltage traces for a cell containing a cathode formed from a metal fluoride and the new matrix material. In this case, the metal fluoride active material is $CuF_2$ and the matrix material is $Cu_3Mo_2O_9$. FIG. 4 demonstrates that the cell has about 140 mAh/g of reversible capacity. Previously known cathodes containing $CuF_2$ have not demonstrated such significant reversible capacity.

Figure 5:
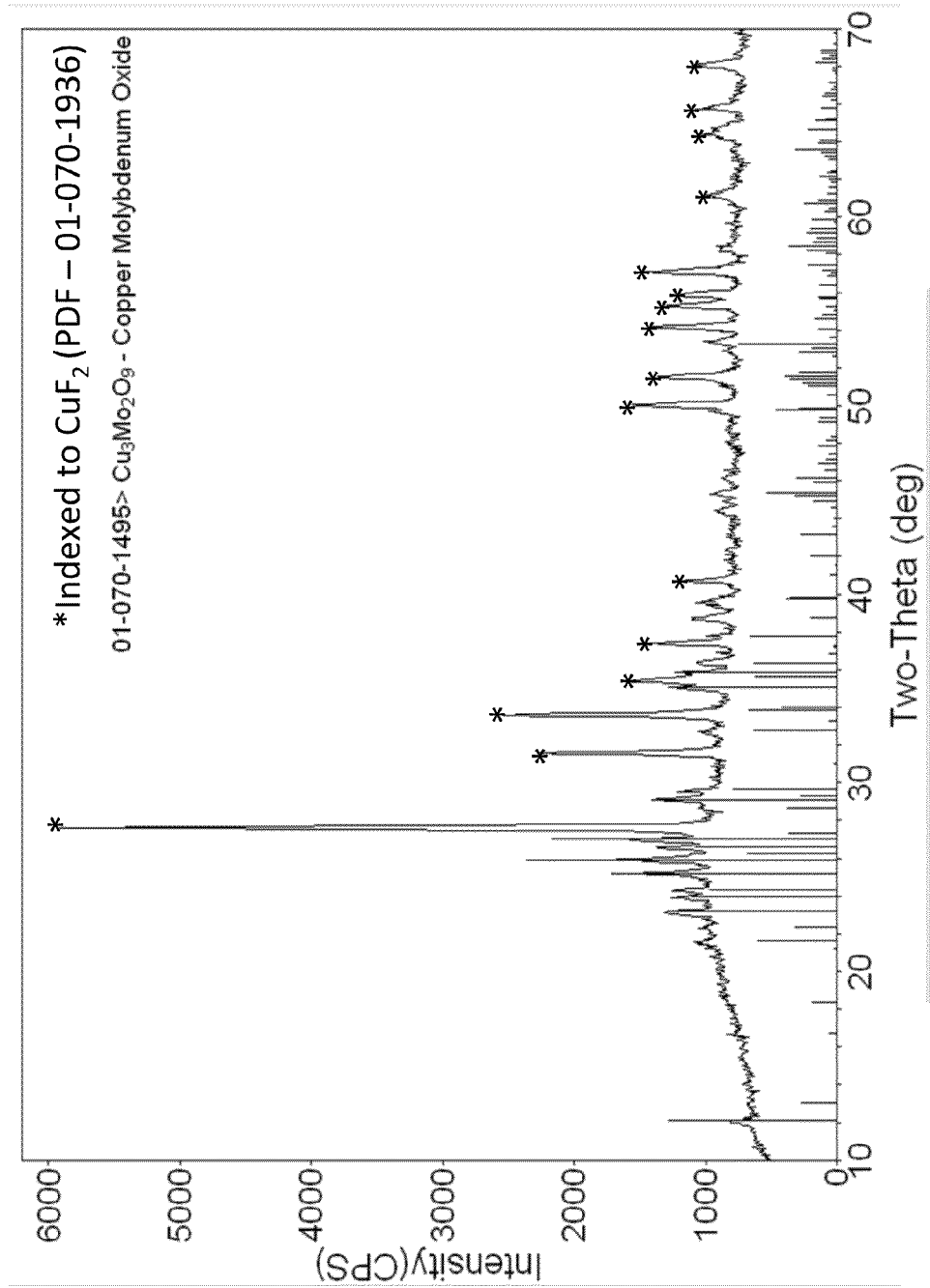
FIG. 5 illustrates a powder X-ray diffraction pattern of a material used to form a rechargeable metal fluoride cathode.

FIG. 5 illustrates the results of structural characterization of certain embodiments disclosed herein. Specifically, the powder X-ray diffraction pattern of the material forming the cathode tested in FIG. 4 is shown along with the powder X-ray diffraction patterns of $CuF_2$ and $Cu_3Mo_2O_9$. FIG. 5 demonstrates that the material contains phases rich in $CuF_2$ and phases rich in $Cu_3Mo_2O_9$. Thus, FIG. 5 demonstrates a new matrix material in combination with a metal fluoride active material. Further, grain size analysis of this powder X-ray diffraction data shows that the $CuF_2$ has a grain size greater than 130 nm. This is a significant finding since such comparatively large particles were thought to be too large to provide good electrochemical performance.

For many of the rechargeable matrices described herein (and in particular for matrices including Mo, Ni, or Ti), the reactions described herein yield a new matrix material at least at the surface of the particles of the metal fluoride active material. The novel material present at least at the surface of the particles of the metal fluoride active material is believed to provided many of the benefits disclosed herein.

Figure 6:
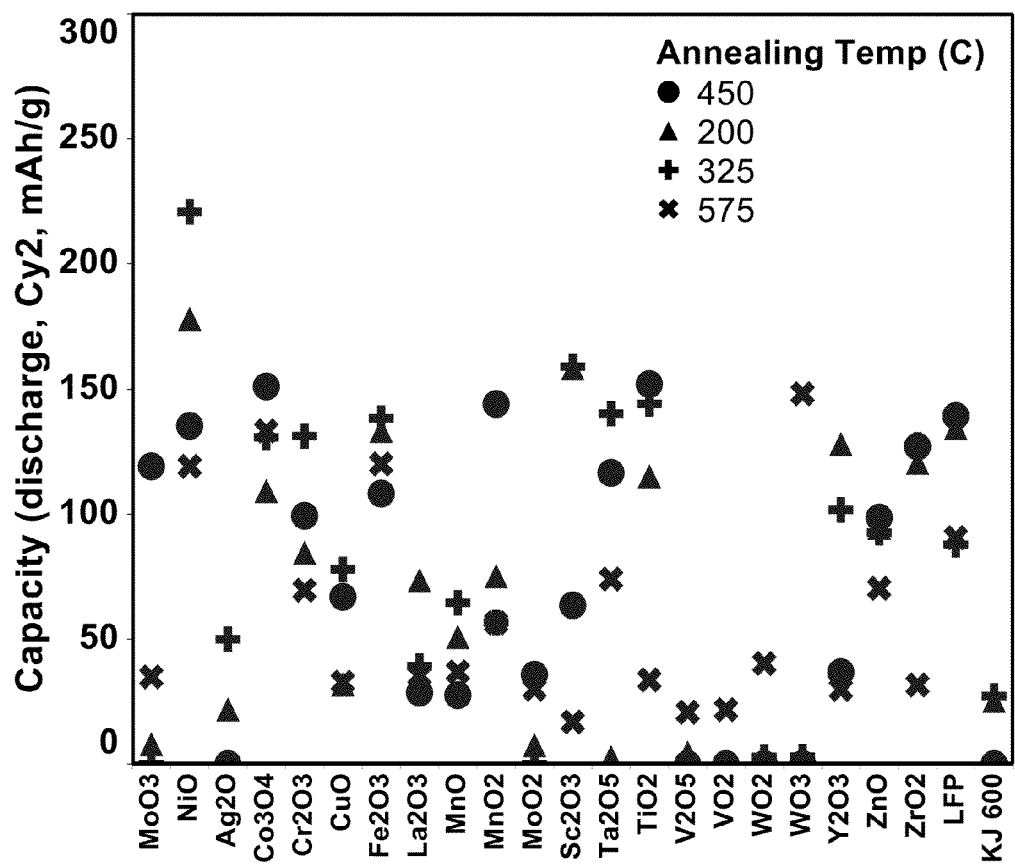
FIG. 6 illustrates second cycle discharge capacity for a variety of hybrid cathode materials used according to embodiments of the invention.

FIG. 6 illustrates the results of electrochemical characterization of certain embodiments disclosed herein. Specifically, the second cycle discharge capacity of $CuF_2$ with various matrices and annealing temperatures. FIG. 6 shows many oxide matrices that provide recharge capability, demonstrated by capacities greater than 100 mAh/g.

Table 1 presents the results of further electrochemical characterization of certain embodiments disclosed herein. Table 1 shows that many metal oxide and metal oxide precursor starting materials can be used in the reactions described herein to yield rechargeable metal fluoride electrode materials. The materials in Table 1 include metal oxides, metal phosphates, metal fluorides, and precursors expected to decompose to oxides. In particular, nickel oxide showed excellent performance.

TABLE 1

Electrochemical Characterization of Various Precursor Materials as a Function of Anneal Temperature

| Matrix/Coating Precursor | Annealing Temp (C.) | Initial Capacity (0.02 C, Cy1, mAh/g) | Reversible Capacity (0.05 C, Cy2, mAh/g) |
|---|---|---|---|
| (NH4)H2PO4 | 200 | 307 | 5 |
| (NH4)H2PO4 | 325 | 406 | 178 |
| (NH4)H2PO4 | 450 | 397 | 0 |
| Al2O3 | 200 | 281 | 70 |
| Al2O3 | 325 | 348 | 107 |
| Al2O3 | 400 | 203 | 78 |
| AlF3 | 200 | 397 | 124 |
| AlF3 | 325 | 384 | 125 |
| AlF3 | 400 | 320 | 98 |
| AlPO4 | 200 | 410 | 115 |
| AlPO4 | 325 | 356 | 136 |
| AlPO4 | 450 | 284 | 74 |
| Bi2O3 | 200 | 128 | 32 |
| Bi2O3 | 325 | 89 | 34 |
| Bi2O3 | 400 | 103 | 36 |
| CaF2 | 200 | 301 | 86 |
| CaF2 | 325 | 310 | 107 |
| CaF2 | 400 | 282 | 125 |
| CaO | 200 | 1 | 1 |
| CaO | 325 | 138 | 27 |
| CaO | 400 | 84 | 29 |
| Co3(PO4)2 | 200 | 323 | 93 |
| Co3(PO4)2 | 325 | 373 | 161 |
| Co3(PO4)2 | 450 | 382 | 126 |
| Co3O4 | 200 | 167 | 112 |
| Co3O4 | 325 | 216 | 132 |
| Co3O4 | 450 | 329 | 151 |
| Co3O4 | 575 | 310 | 134 |
| Cr2O3 | 200 | 223 | 88 |
| Cr2O3 | 325 | 234 | 132 |
| Cr2O3 | 450 | 227 | 102 |
| Cr2O3 | 575 | 184 | 70 |
| Fe Acetate | 200 | 407 | 31 |
| Fe Acetate | 325 | 431 | 11 |
| Fe Acetate | 450 | 393 | 180 |
| Fe2O3 | 200 | 197 | 135 |
| Fe2O3 | 325 | 200 | 142 |
| Fe2O3 | 450 | 170 | 112 |
| Fe2O3 | 575 | 308 | 131 |
| FeF2 | 200 | 427 | 202 |
| FeF2 | 325 | 382 | 220 |
| FeF2 | 400 | 370 | 155 |
| FeF3 | 200 | 443 | 188 |
| FeF3 | 325 | 406 | 218 |
| FeF3 | 400 | 359 | 141 |
| FePO4 | 200 | 252 | 76 |
| FePO4 | 325 | 393 | 147 |
| FePO4 | 450 | 429 | 197 |
| In2O3 | 200 | 250 | 64 |
| In2O3 | 325 | 203 | 106 |
| In2O3 | 400 | 347 | 109 |
| La2O3 | 200 | 281 | 74 |
| La2O3 | 325 | 155 | 39 |
| La2O3 | 450 | 68 | 29 |
| La2O3 | 575 | 114 | 36 |
| Li2O | 200 | 32 | 11 |
| Li2O | 325 | 49 | 18 |
| Li2O | 400 | 38 | 18 |
| Li3PO4 | 200 | 318 | 123 |
| Li3PO4 | 325 | 435 | 136 |
| Li3PO4 | 450 | 409 | 114 |
| LiCoPO4 | 200 | 372 | 97 |
| LiCoPO4 | 325 | 408 | 142 |
| LiCoPO4 | 450 | 338 | 136 |
| LiH2PO4 | 200 | 300 | 111 |
| LiH2PO4 | 325 | 423 | 149 |
| LiH2PO4 | 450 | 387 | 107 |
| LiMnPO4 | 200 | 351 | 77 |
| LiMnPO4 | 325 | 368 | 102 |
| LiMnPO4 | 450 | 397 | 178 |
| LiNiPO4 | 200 | 402 | 116 |
| LiNiPO4 | 325 | 396 | 191 |
| LiNiPO4 | 450 | 405 | 176 |
| MgF2 | 200 | 387 | 135 |
| MgF2 | 325 | 378 | 147 |
| MgF2 | 400 | 360 | 122 |
| MgO | 200 | 313 | 181 |
| MgO | 325 | 259 | 155 |
| MgO | 400 | 198 | 126 |
| MnO | 200 | 117 | 52 |
| MnO | 325 | 130 | 65 |
| MnO | 450 | 83 | 55 |
| MnO | 575 | 59 | 38 |
| MnO2 | 200 | 120 | 76 |
| MnO2 | 325 | 123 | 57 |
| MnO2 | 450 | 242 | 150 |
| MnO2 | 575 | 104 | 69 |
| Mo Acetate | 200 | 396 | 10 |
| Mo Acetate | 325 | 433 | 17 |
| Mo Acetate | 450 | 398 | 46 |
| Na2O | 200 | 2 | 1 |
| Na2O | 325 | 26 | 13 |
| Na2O | 400 | 24 | 13 |
| Ni | 200 | 345 | 197 |
| Ni | 325 | 301 | 178 |
| Ni | 400 | 302 | 158 |
| Ni | 450 | 300 | 152 |
| Ni acac | 200 | 425 | 56 |
| Ni acac | 325 | 306 | 87 |
| Ni Acac | 400 | 247 | 30 |
| Ni Acac | 450 | 362 | 172 |
| Ni acetate | 200 | 397 | 148 |
| Ni acetate | 325 | 376 | 46 |
| Ni acetate | 350 | 370 | 191 |
| Ni acetate | 400 | 383 | 180 |
| Ni acetate | 450 | 371 | 186 |
| Ni acetate | 500 | 373 | 171 |
| Ni3(PO4)2 | 200 | 410 | 124 |
| Ni3(PO4)2 | 325 | 430 | 52 |
| Ni3(PO4)2 | 450 | 126 | 44 |
| Ni(C2O2) | 200 | 359 | 90 |
| Ni(C2O2) | 325 | 395 | 195 |
| Ni(C2O2) | 450 | 381 | 175 |
| Ni(CP)2 | 200 | 304 | 27 |
| Ni(CP)2 | 325 | 317 | 14 |
| Ni(CP)2 | 450 | 258 | 148 |
| Ni(OH)2 | 200 | 412 | 186 |
| Ni(OH)2 | 325 | 362 | 196 |
| Ni(OH)2 | 400 | 327 | 181 |
| Ni(OH)2 | 450 | 300 | 169 |
| NiBr2 | 200 | 125 | 0 |
| NiBr2 | 325 | 225 | 78 |

TABLE 1-continued

Electrochemical Characterization of Various Precursor Materials as a Function of Anneal Temperature

| Matrix/Coating Precursor | Annealing Temp (C.) | Initial Capacity (0.02 C, Cy1, mAh/g) | Reversible Capacity (0.05 C, Cy2, mAh/g) |
|---|---|---|---|
| NiBr2 | 400 | 244 | 113 |
| NiCO3*Ni(OH)2 | 200 | 380 | 17 |
| NiCO3*Ni(OH)2 | 325 | 359 | 215 |
| NiCO3*Ni(OH)2 | 450 | 317 | 184 |
| NiF2 | 200 | 367 | 121 |
| NiF2 | 325 | 395 | 207 |
| NiF2 | 400 | 411 | 170 |
| NiF2 | 450 | 396 | 177 |
| NiO | 125 | 257 | 131 |
| NiO | 200 | 403 | 222 |
| NiO | 225 | 384 | 212 |
| NiO | 250 | 385 | 221 |
| NiO | 275 | 370 | 229 |
| NiO | 300 | 335 | 175 |
| NiO | 325 | 402 | 252 |
| NiO | 350 | 365 | 209 |
| NiO | 375 | 260 | 123 |
| NiO | 400 | 371 | 200 |
| NiO | 425 | 361 | 186 |
| NiO | 450 | 386 | 183 |
| NiO | 500 | 308 | 150 |
| NiO | 575 | 319 | 112 |
| None | 200 | 181 | 30 |
| None | 325 | 394 | 216 |
| None | 450 | 247 | 61 |
| Sb2O3 | 200 | 111 | 34 |
| Sb2O3 | 325 | 147 | 37 |
| Sb2O3 | 400 | 223 | 104 |
| Sc2O3 | 200 | 359 | 159 |
| Sc2O3 | 325 | 293 | 159 |
| Sc2O3 | 400 | 84 | 33 |
| Sc2O3 | 450 | 150 | 68 |
| Sc2O3 | 575 | 55 | 17 |
| ScF3 | 200 | 400 | 178 |
| ScF3 | 325 | 387 | 174 |
| ScF3 | 400 | 243 | 100 |
| SiO2 | 200 | 1 | 1 |
| SiO2 | 325 | 114 | 28 |
| SiO2 | 400 | 230 | 92 |
| SnO2 | 200 | 210 | 48 |
| SnO2 | 325 | 182 | 68 |
| SnO2 | 400 | 133 | 65 |
| SrO | 200 | 152 | 12 |
| SrO | 325 | 66 | 16 |
| SrO | 400 | 134 | 48 |
| Ta2O5 | 200 | 289 | 4 |
| Ta2O5 | 325 | 269 | 141 |
| Ta2O5 | 450 | 298 | 121 |
| Ta2O5 | 575 | 317 | 74 |
| Ti(OEt)4 | 200 | 438 | 21 |
| Ti(OEt)4 | 325 | 453 | 12 |
| Ti(OEt)4 | 450 | 353 | 5 |
| TiO2 | 225 | 322 | 150 |
| TiO2 | 250 | 309 | 169 |
| TiO2 | 275 | 262 | 162 |
| TiO2 | 300 | 199 | 127 |
| TiO2 | 325 | 322 | 173 |
| TiO2 | 350 | 327 | 187 |
| TiO2 | 375 | 120 | 77 |
| TiO2 | 400 | 359 | 199 |
| TiO2 | 425 | 345 | 194 |
| TiO2 | 450 | 353 | 169 |
| Y2O3 | 200 | 353 | 130 |
| Y2O3 | 325 | 279 | 104 |
| Y2O3 | 450 | 83 | 37 |
| Y2O3 | 575 | 80 | 30 |
| ZnF2 | 200 | 438 | 206 |
| ZnF2 | 325 | 372 | 191 |
| ZnF2 | 400 | 318 | 134 |
| ZnO | 200 | 210 | 95 |
| ZnO | 325 | 242 | 93 |
| ZnO | 400 | 194 | 44 |
| ZnO | 450 | 205 | 99 |
| ZnO | 575 | 151 | 71 |
| ZrO2 | 200 | 302 | 122 |
| ZrO2 | 325 | 288 | 129 |

Figure 7:
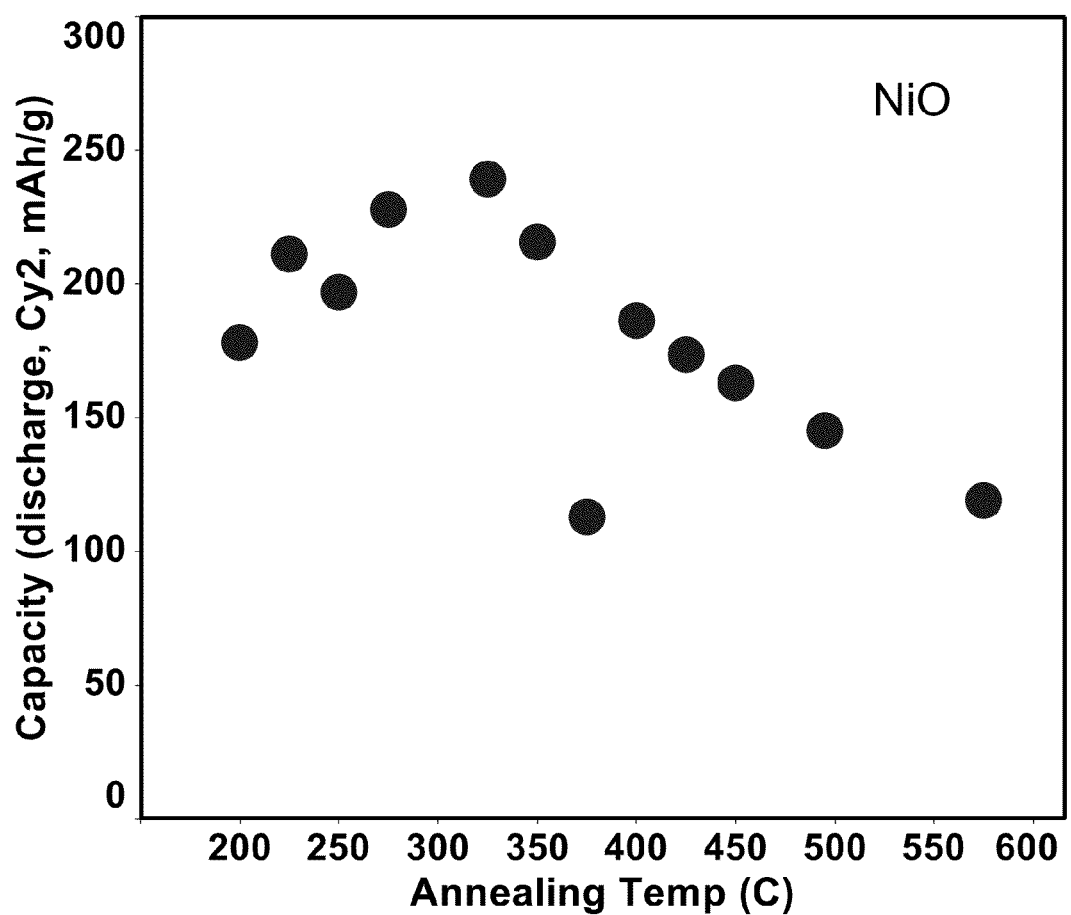
FIG. 7 illustrates second cycle discharge capacity for a hybrid cathode material used according to embodiments of the invention versus annealing temperature.

FIG. 7 illustrates the results of electrochemical characterization of certain embodiments disclosed herein. Specifically, the second cycle discharge capacity for cells containing a cathode formed from a metal fluoride and the matrix material treated at different temperatures. In this case, the metal fluoride active material is $CuF_2$ and the matrix material is NiO. FIG. 7 shows a peak for cycle 2 capacity at about 325 degrees C. for NiO matrices, with nearly 250 mAh/g discharge capacity.

Figure 8:
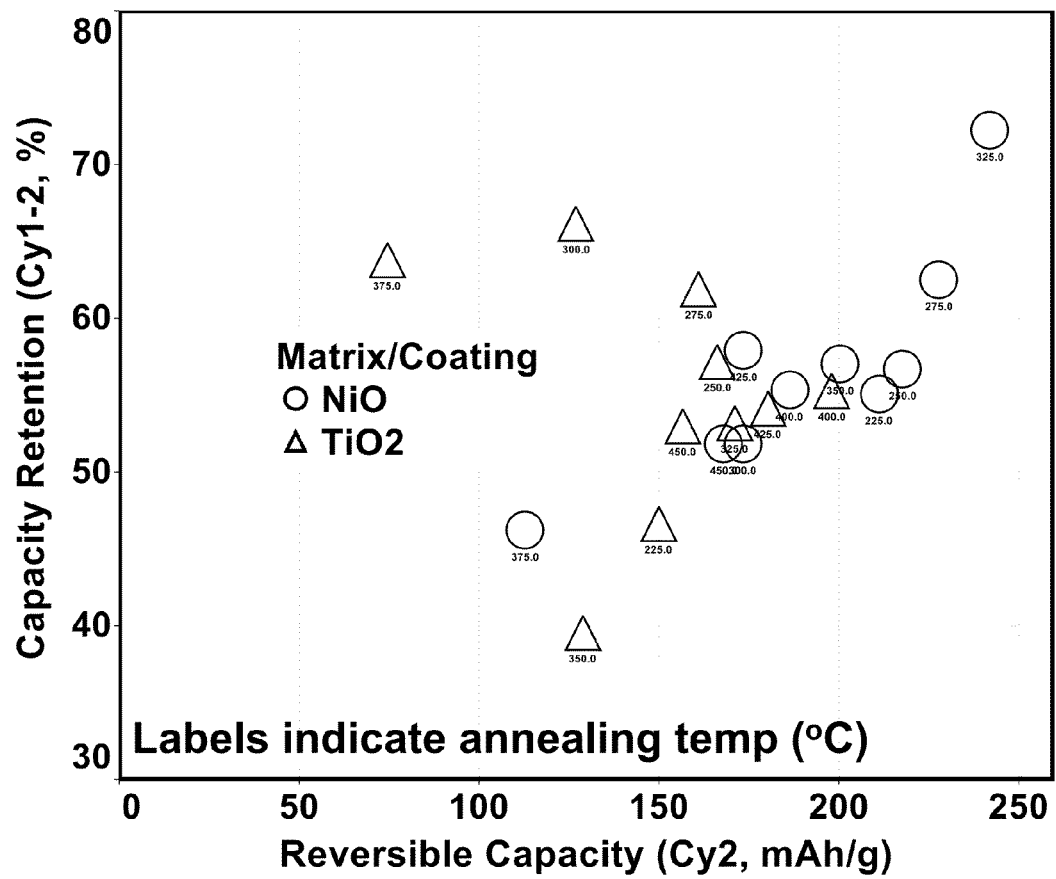
FIG. 8 illustrates second cycle the capacity retention and reversible capacity for cathode active materials formed from reacting 85 wt % $CuF_2$ with 15 wt % of certain metal oxides (in this case NiO or $TiO_2$) at certain annealing temperatures.

FIG. 8 illustrates the results of electrochemical characterization of certain embodiments disclosed herein, specifically, the second-cycle capacity retention and reversible capacity for cathode active materials formed from reacting 85 wt % $CuF_2$ with 15 wt % of certain metal oxides (in this case NiO or $TiO_2$) at certain annealing temperatures. The mixtures were milled at high energy for about 20 hours. The anneal temperatures ranged from about 225 degrees C. to about 450 degrees C. and the anneal time was 6 hours. The 325 degree C. anneal temperature for the NiO starting material generated the best performance. The cells used a Li anode and an electrolyte containing 1M $LiPF_6$ in EC:EMC. The testing was performed at a rate of 0.02 C and over a voltage range of 2.0 V to 4.0 V.

Figure 9:
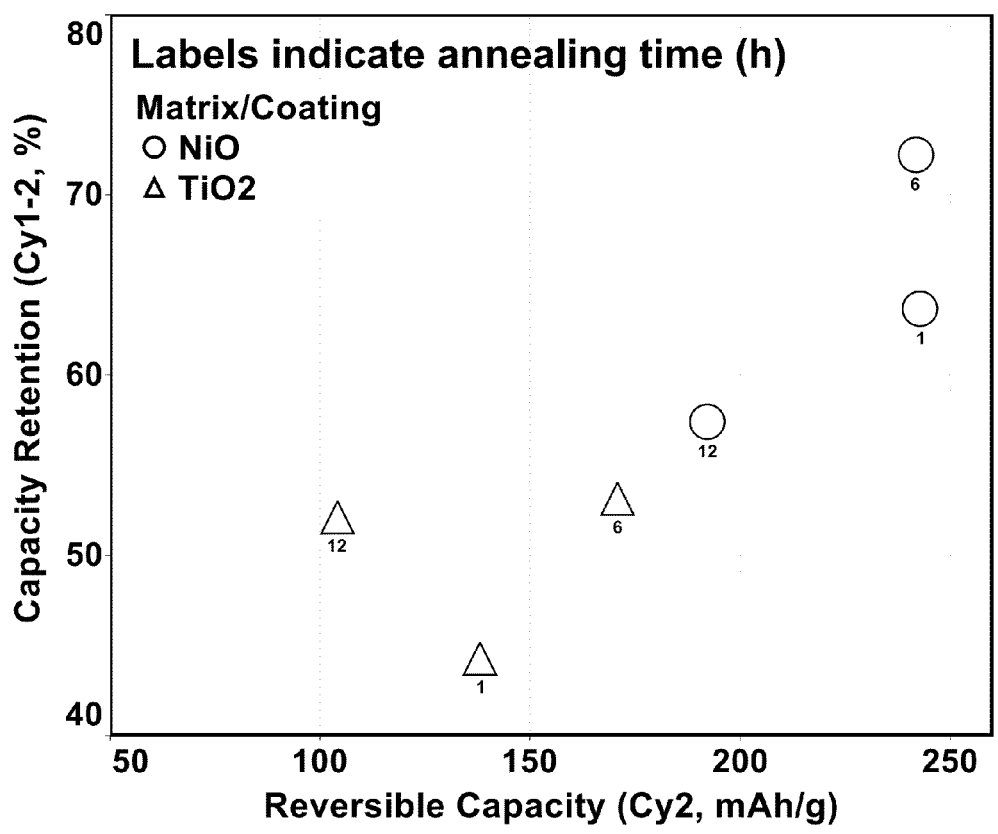
FIG. 9 illustrates the second-cycle capacity retention and reversible capacity for cathode active materials formed from reacting 85 wt % $CuF_2$ with 15 wt % of certain metal oxides (in this case NiO or $TiO_2$) for certain annealing times.

FIG. 9 illustrates the results of electrochemical characterization of certain embodiments disclosed herein, specifically, the second-cycle capacity retention and reversible capacity for cathode active materials formed from reacting 85 wt % $CuF_2$ with 15 wt % of certain metal oxides (in this case NiO or $TiO_2$) for certain annealing times. The mixtures were milled at high energy for about 20 hours. The anneal temperature was 325 degrees C. and the anneal time was 1 hour, 6 hours, or 12 hours. The 6 hour anneal time yielded the best results for both the NiO and $TiO_2$ starting materials, and the NiO starting material generated better performance. The cells used a Li anode and an electrolyte containing 1M $LiPF_6$ in EC:EMC. The testing was performed at a rate of 0.02 C and over a voltage range of 2.0 V to 4.0 V.

Figure 10:
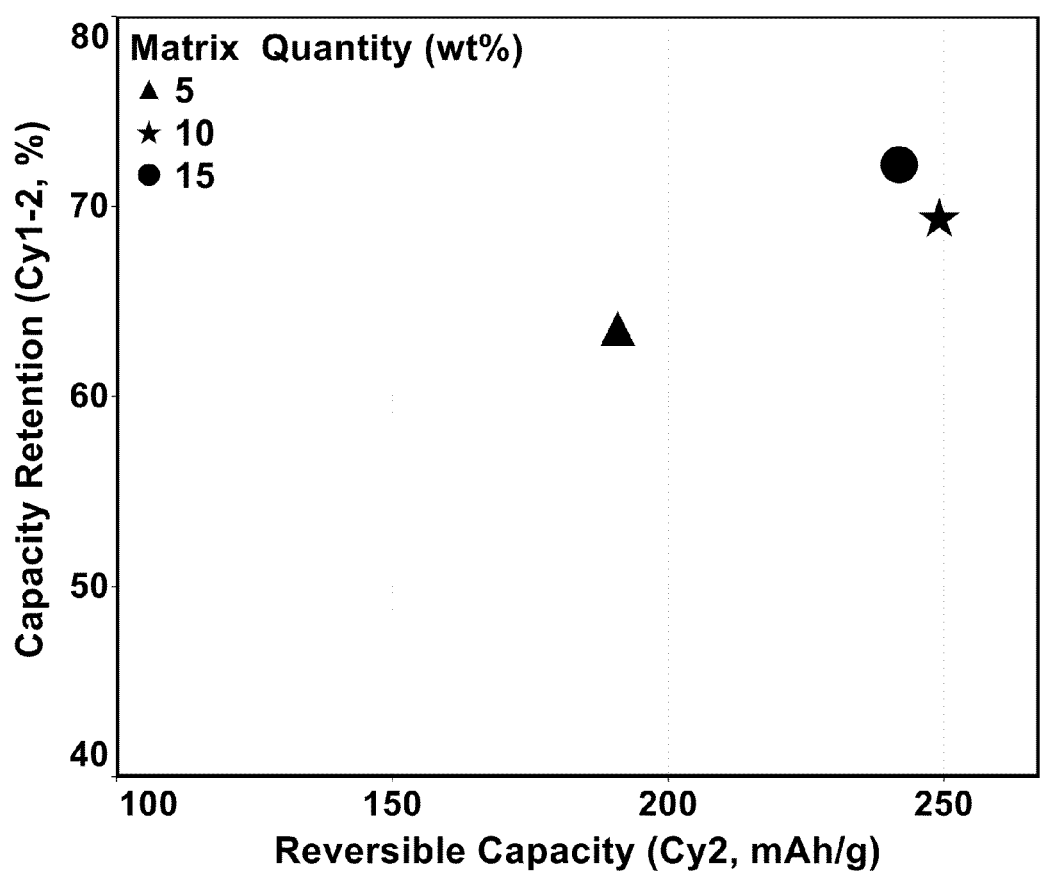
FIG. 10 illustrates the second-cycle capacity retention and reversible capacity for cathode active materials formed from reacting 85 wt %, 90 wt %, or 95 wt % $CuF_2$ with 5 wt %, 10 wt %, 15 wt % of NiO.

FIG. 10 illustrates the results of electrochemical characterization of certain embodiments disclosed herein, specifically, the second-cycle capacity retention and reversible capacity for cathode active materials formed from reacting 85 wt %, 90 wt %, or 95 wt % $CuF_2$ with 5 wt %, 10 wt %, 15 wt % of NiO. The mixtures were milled at high energy for about 20 hours. The anneal temperature was 325 degrees C. and the anneal time was 6 hours. Using 10 wt % or 15 wt % of the NiO starting material generated better performance. The cells used a Li anode and an electrolyte containing 1M $LiPF_6$ in EC:EMC. The testing was performed at a rate of 0.02 C and over a voltage range of 2.0 V to 4.0 V.

Figure 11:
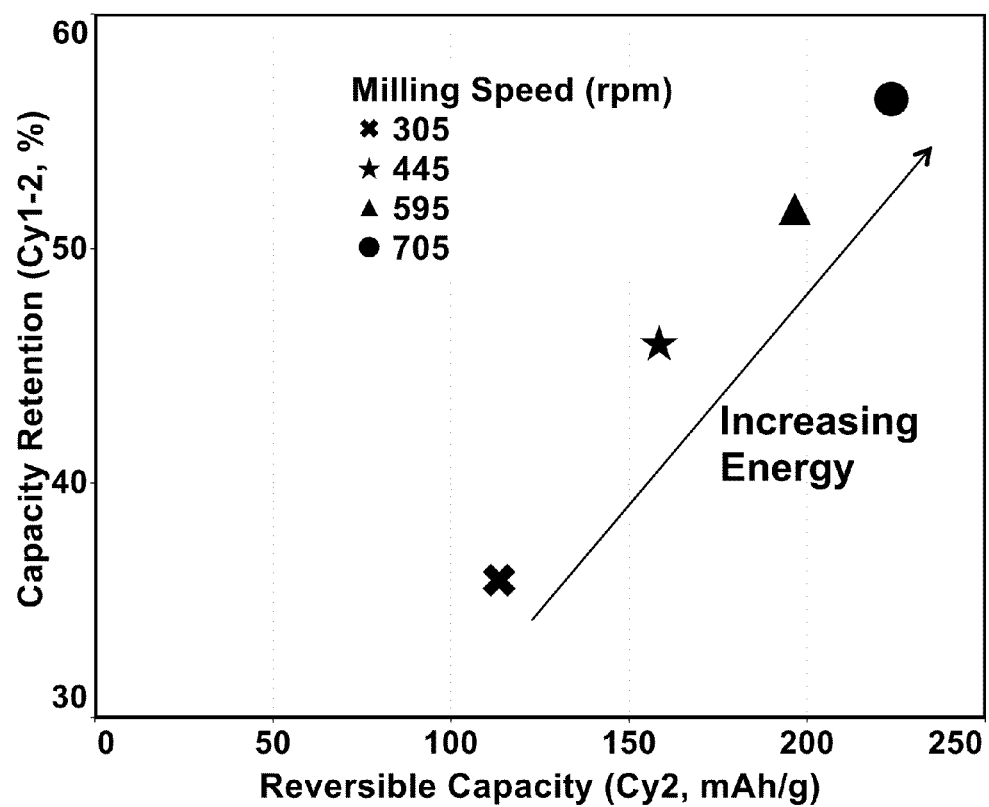
FIG. 11 illustrates the second-cycle capacity retention and reversible capacity for cathode active materials formed from reacting 85 wt %, $CuF_2$ with 15 wt % of NiO as a function of milling energy.

FIG. 11 illustrates the results of electrochemical characterization of certain embodiments disclosed herein, specifically, the second-cycle capacity retention and reversible capacity for cathode active materials formed from reacting 85 wt %, $CuF_2$ with 15 wt % of NiO. The mixtures were milled at various energies comparable to milling on a Fritch Pulverisette 7 Planatery Mill at 305, 445, 595, and 705 RPM for about 20 hours. The anneal temperature was 325 degrees C. and the anneal time was 6 hours. Performance improves with increasing milling energy, suggesting that intimate physical interaction of the materials is required. The cells used a Li anode and an electrolyte containing 1M $LiPF_6$ in EC:EMC. The testing was performed at a rate of 0.05 C and over a voltage range of 2.0 V to 4.0 V.

Figure 12:
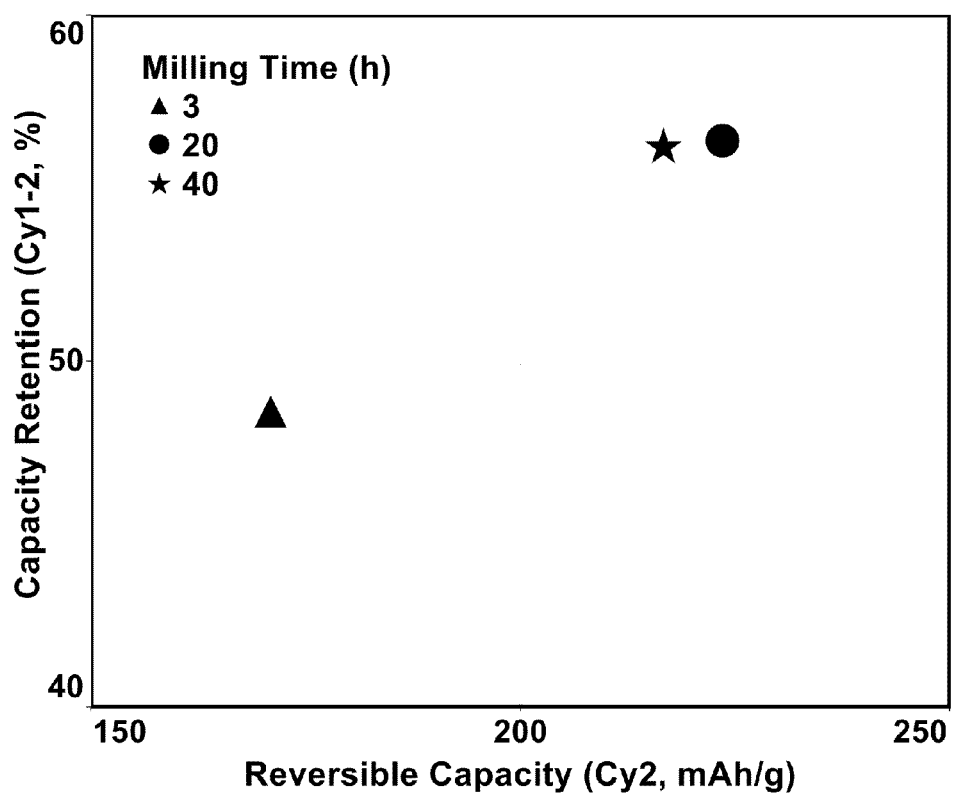
FIG. 12 illustrates the second-cycle capacity retention and reversible capacity for cathode active materials formed from reacting 85 wt %, $CuF_2$ with 15 wt % of NiO as a function of milling time.

FIG. 12 illustrates the results of electrochemical characterization of certain embodiments disclosed herein, specifically, the second-cycle capacity retention and reversible capacity for cathode active materials formed from reacting 85 wt %, $CuF_2$ with 15 wt % of NiO. The mixtures were milled for various times (3 hours, 20 hours, or 40 hours) at a high energy (comparable to 705 RPM on Fritch Pulverisette 7). The anneal temperature was 325 degrees C. and the anneal time was 6 hours. Performance does not improve after 20 hours of milling. The cells used a Li anode and an electrolyte containing 1M $LiPF_6$ in EC:EMC. The testing was performed at a rate of 0.05 C and over a voltage range of 2.0 V to 4.0 V.

Figure 13:
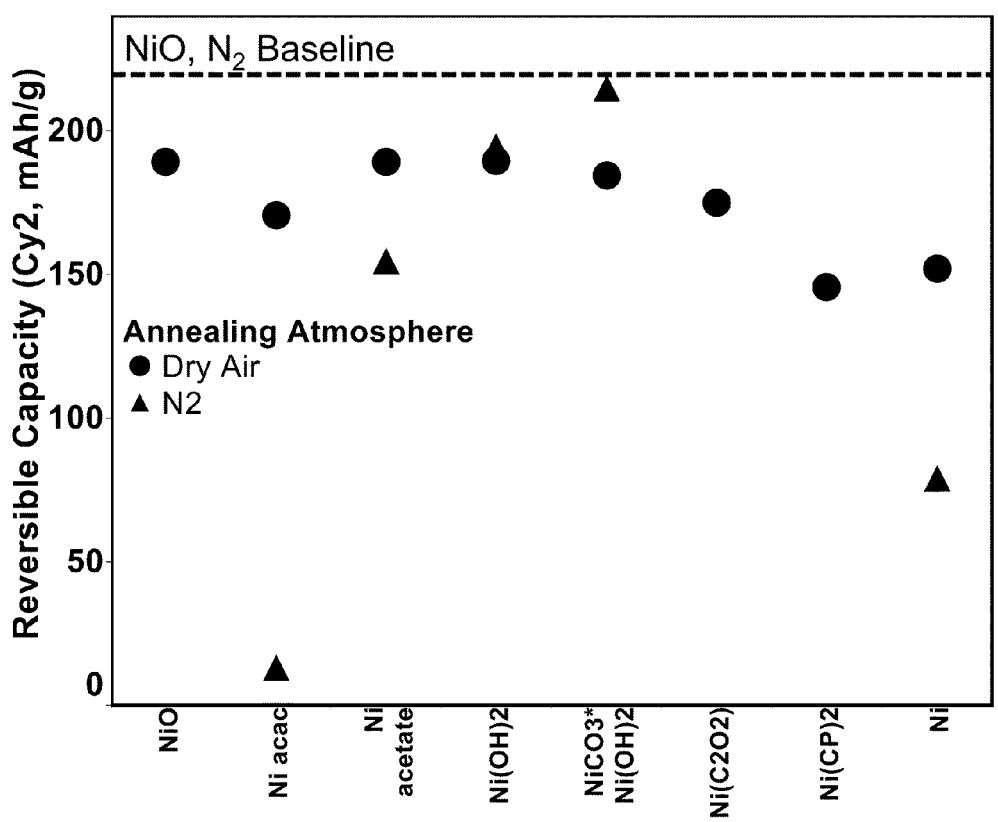
FIG. 13 illustrates the second cycle reversible capacity measured for various starting materials used to react with $CuF_2$.

FIG. 13 illustrates the results of electrochemical characterization of certain embodiments disclosed herein. Specifically, FIG. 13 shows the second cycle reversible capacity measured for various starting materials used to react with $CuF_2$. The starting materials include NiO, nickel(II) acetylacetonate, nickel acetate, nickel hydroxide, $NiCO_3*Ni(OH)_2$, $Ni(C_2O_2)$, $Ni(CP)_2$, and Ni. In some instances, the starting materials react to form a new phase. The materials react with the surface of the $CuF_2$ particles. Additionally, the anneal atmosphere was either $N_2$ or dry air. The precursor-type starting materials decompose to NiO (although this depends on the atmosphere for some precursors) at or below the annealing temperatures used for the reaction. The precursors that are soluble or have low boiling points can enable solution or vapor deposition processing methods. The cells used a Li anode and an electrolyte containing 1M $LiPF_6$ in EC:EMC. The testing was performed at a rate of 0.05 C and over a voltage range of 2.0 V to 4.0 V. Several materials show similar performance to the NiO baseline.

Figure 14:
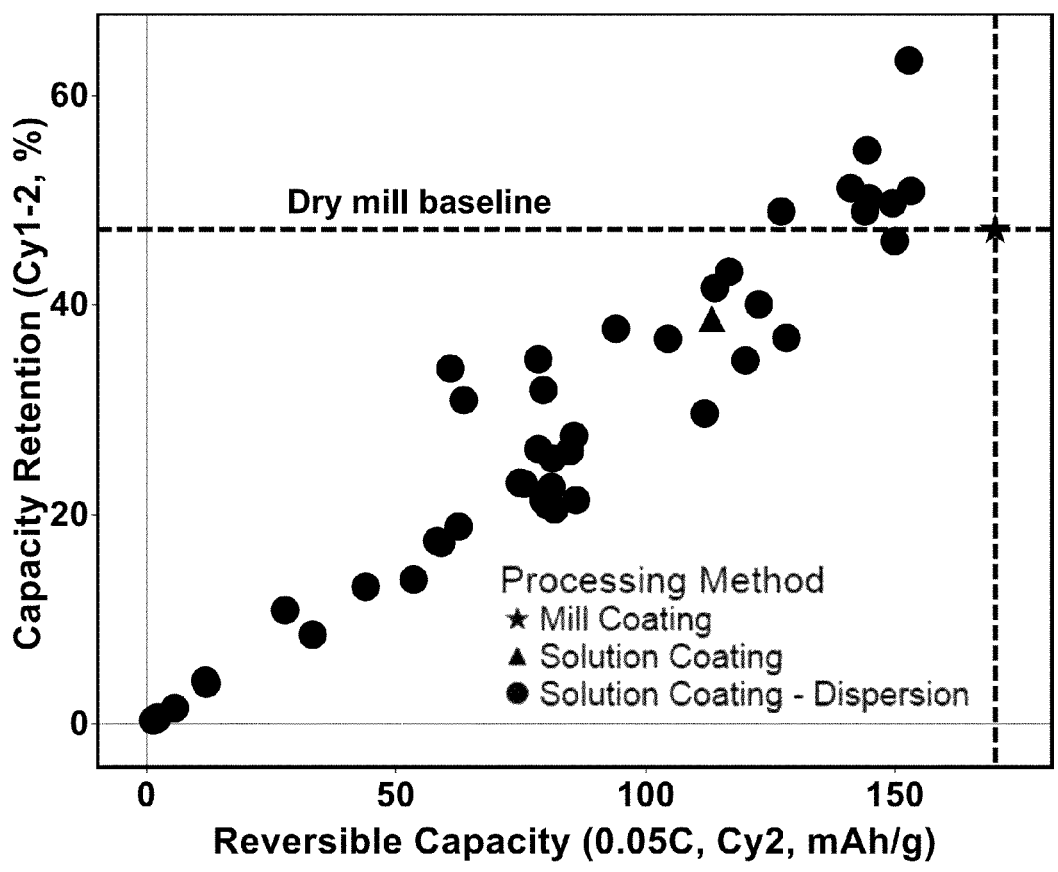
FIG. 14 illustrates the second-cycle capacity retention and reversible capacity for cathode active materials formed from reacting $CuF_2$ with nickel(II) acetylacetonate using various processing conditions.

FIG. 14 illustrates the results of electrochemical characterization of certain embodiments disclosed herein, specifically, the second-cycle capacity retention and reversible capacity for cathode active materials formed from reacting $CuF_2$ with nickel(II) acetylacetonate using various processing conditions. In some cases, the CuF2 was dispered using methods described herein. The coatings were applied using mill coating techniques (that is, agitating the mixture in a milling apparatus) or by solution coating techniques (including solution coating driven by physisorption). All samples were annealed under dry air. The cells used a Li anode and an electrolyte containing 1M $LiPF_6$ in EC:EMC. The testing was performed at a rate of 0.05 C and over a voltage range of 2.0 V to 4.0 V. Testing demonstrates that solution coating methods can provide similar performance to the mill coating techniques.

Figure 15:
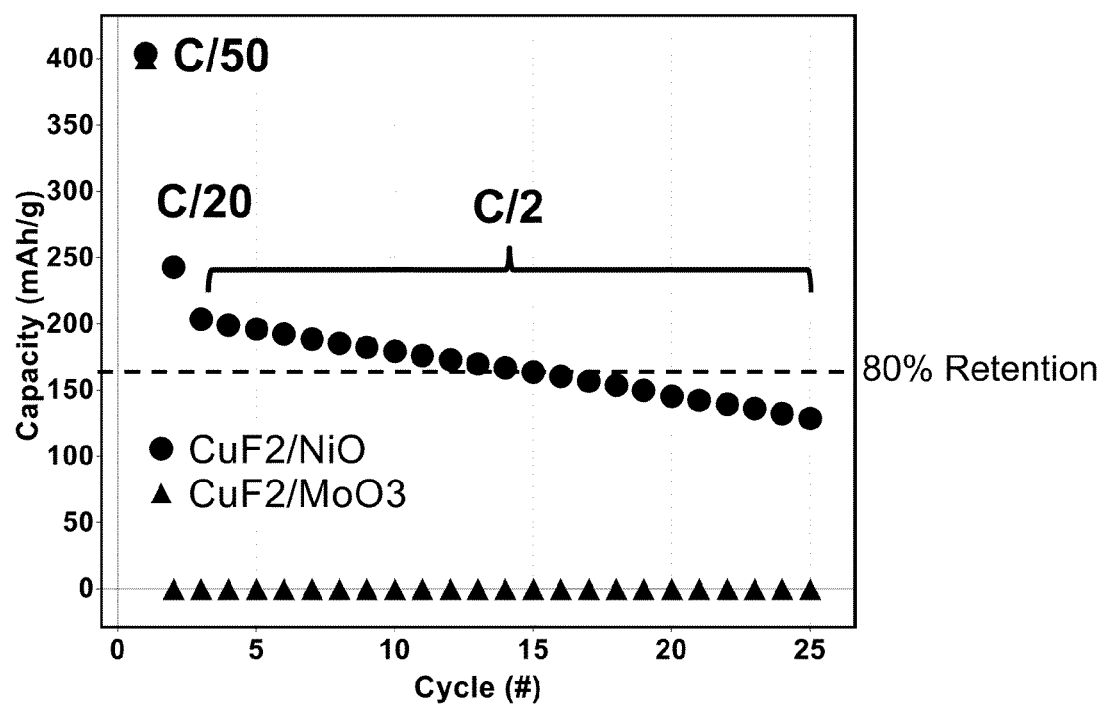
FIG. 15 illustrates the capacity as a function of cycle for cathode active materials formed from reacting 85 wt %, $CuF_2$ with 15 wt % of NiO and for a control material.

FIG. 15 illustrates the results of electrochemical characterization of certain embodiments disclosed herein, specifically, the capacity as a function of cycle for cathode active materials formed from reacting 85 wt %, $CuF_2$ with 15 wt % of NiO and for a control material. The NiO/$CuF_2$ mixture was milled at high energy for about 20 hours. The anneal temperature was 325 degrees C. and the anneal time was 6 hours. The cells used a Li anode and an electrolyte containing 1M $LiPF_6$ in EC:EMC. The testing was performed at a cycle 1 rate of 0.02 C, a cycle 2 rate of 0.05 C, and a cycle 3 through cycle 25 rate of 0.5 C and over a voltage range of 2.0 V to 4.0 V. With the reacted NiO/$CuF_2$ as the active material, the cell cycles reversibly for extended cycling with capacity greater than 100 mAh/g for 25 cycles. Further, the reacted NiO/$CuF_2$ active material demonstrates retention of 80% of cycle 3 capacity as far out as cycle 15. The control material, which was prepared according to the process described in Badway, F. et al., *Chem. Mater.*, 2007, 19, 4129, does not demonstrate any rechargeable capacity. Thus, the material prepared according to embodiments described herein is significantly superior to known materials processed according to known methods.

Figure 16:
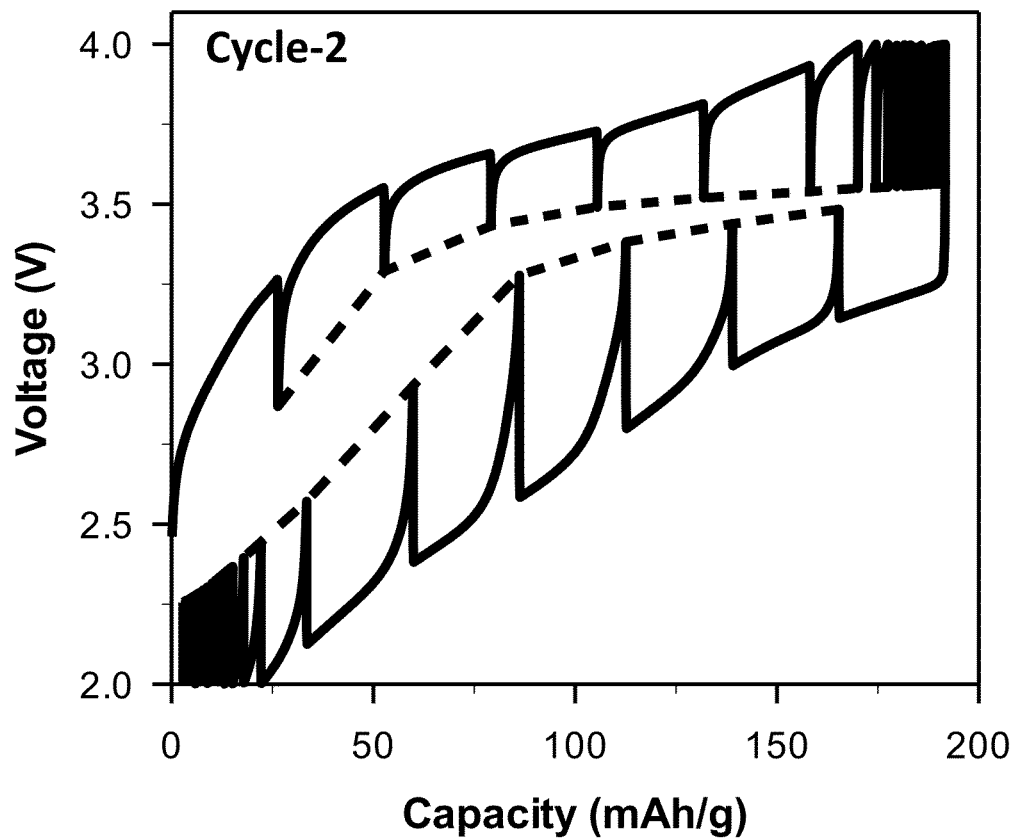
FIG. 16 illustrates a galvanostatic intermittent titration technique measurement for cathode active materials formed from reacting 85 wt %, $CuF_2$ with 15 wt % of NiO.

FIG. 16 illustrates the results of electrochemical characterization of certain embodiments disclosed herein, specifically, a galvanostatic intermittent titration technique (GITT) measurement for cathode active materials formed from reacting 85 wt %, $CuF_2$ with 15 wt % of NiO and for a control material. The NiO/$CuF_2$ mixture was milled at high energy for about 20 hours. The anneal temperature was 325 degrees C. and the anneal time was 6 hours. The cells used a Li anode and an electrolyte containing 1M $LiPF_6$ in EC:EMC. The testing was performed over a voltage range of 2.0 V to 4.0 V at a rate of 0.1 C and with a 10 hour relaxation time. The GITT measurement relaxation points show low voltage hysteresis (about 100 mV), which indicate that the overpotential and/or underpotential are likely caused by kinetic and not thermodynamic limitations. This is consistent with other properties and characteristics observed for the reacted NiO/$CuF_2$ active material.

Figure 17:
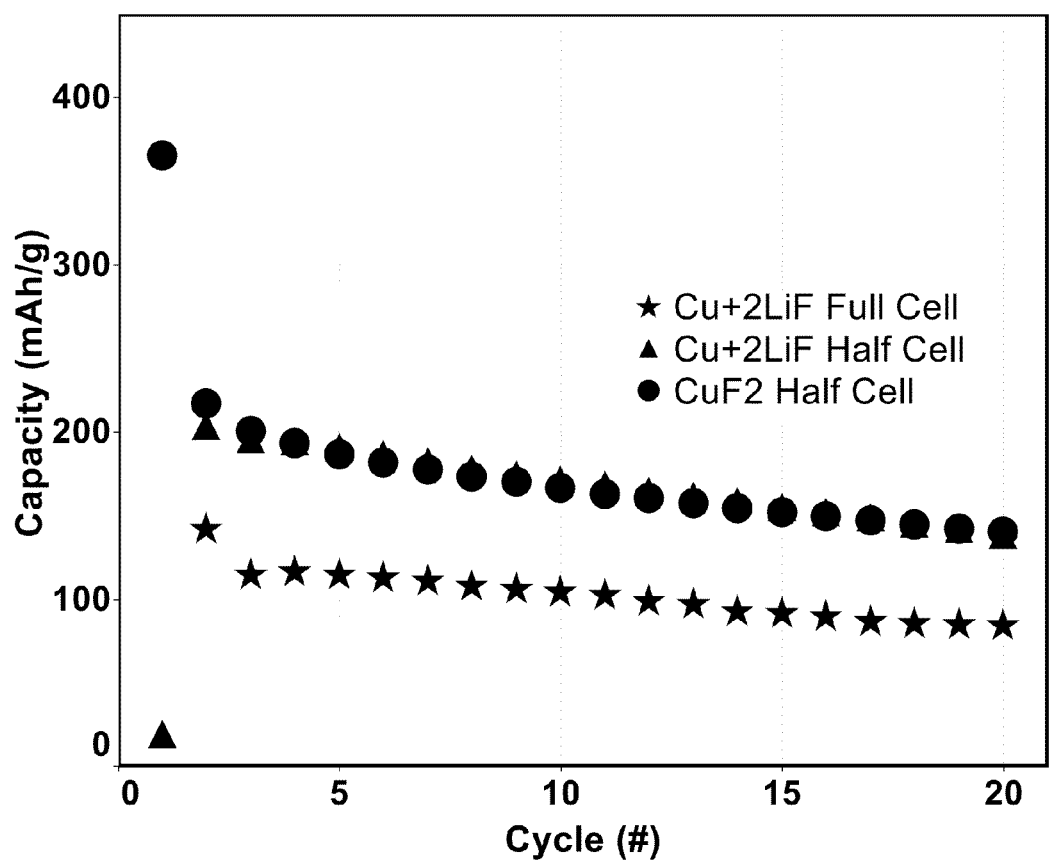
FIG. 17 illustrates the capacity of full cells and half cells as a function of cycle for cathode active materials formed from reacting 85 wt %, $CuF_2$ with 15 wt % of NiO.

FIG. 17 illustrates the results of electrochemical characterization of certain embodiments disclosed herein, specifically, the capacity of full cells and half cells as a function of cycle for cathode active materials formed from reacting 85 wt %, $CuF_2$ with 15 wt % of NiO. The NiO/$CuF_2$ mixture was milled at high energy for about 20 hours. The anneal temperature was 325 degrees C. and the anneal time was 6 hours. The label "Cu+2LiF" indicated that the NiO/$CuF_2$ electrode was lithiated by pressing Li foil to CuF2 electrode in the presence of electrolyte as described above. The other half cell was lithiated electrochemically in the initial cycles. The cells used a Li anode and an electrolyte containing 1M $LiPF_6$ in EC:EMC. The testing was performed over a voltage range of 2.0 V to 4.0 V. Half cell performance is essentially identical between the two lithiation methods after cycle 2, while full cell shows additional irreversible capacity loss as compared to the half cells but similar capacity retention.

Figure 18:
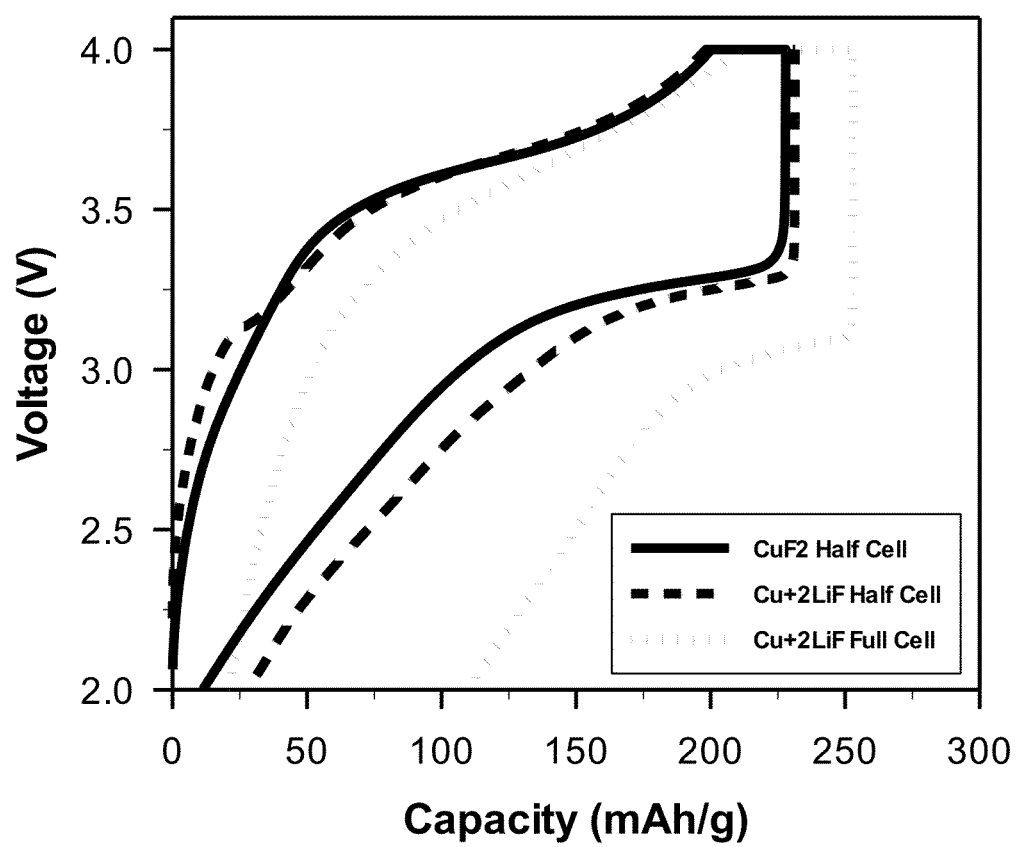
FIG. 18 illustrates voltage traces of the full cell and half cells prepared as described in relation to FIG. 17.

FIG. 18 illustrates the results of electrochemical characterization of certain embodiments disclosed herein, specifically, the voltage traces of the full cell and half cells prepared as described in relation to FIG. 17. The full cell has similar charge capacity to the half cells, but larger irreversible capacity loss and lower discharge voltage (which can indicate increased cell impedance). FIG. 18 demonstrates that the full cell has about 250 mAh/g of reversible capacity and about 500 mV hysteresis between charge and discharge plateau voltages.

Figure 19:
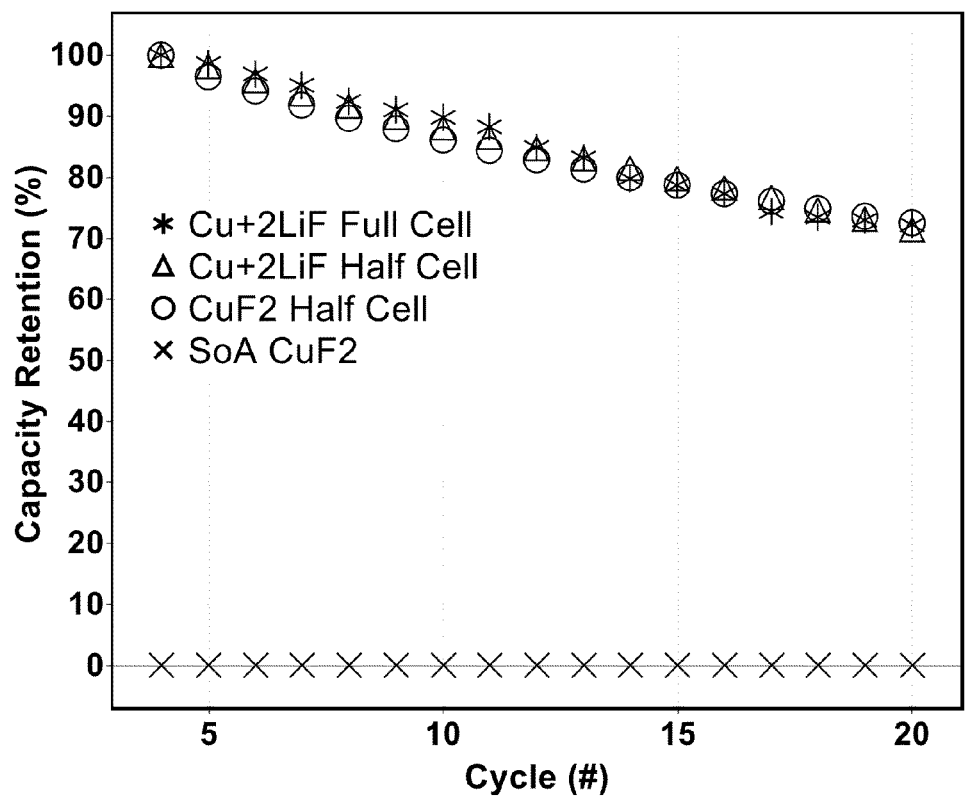
FIG. 19 illustrates the capacity retention of full cells and half cells as a function of cycle for cathode active materials formed from reacting 85 wt %, $CuF_2$ with 15 wt % of NiO.

FIG. 19 illustrates the results of electrochemical characterization of certain embodiments disclosed herein, specifically, the capacity retention of full cells and half cells as a function of cycle for cathode active materials formed from reacting 85 wt %, $CuF_2$ with 15 wt % of NiO. The results from a control material are also depicted. The full cell and half cells were prepared as described in relation to FIG. 17. The cells used a Li anode and an electrolyte containing 1M $LiPF_6$ in EC:EMC. The testing was performed at a cycle 1 rate of 0.1 C and over a voltage range of 2.0 V to 4.0 V. The capacity retention is essentially identical for the full and half cells of the NiO/$CuF_2$ active material. The control material shows essentially no rechargeable capacity.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

The invention claimed is:

1. A composition comprising:
   a particle comprising $CuF_2$; and
   a surface coating on the particle, wherein the coating comprises a hybrid material formed by reacting via heat treatment the $CuF_2$ and a metal complex, the metal complex including Ni; and
   wherein the hybrid material comprises Cu and Ni and wherein the composition has rechargeable capacity.

2. The composition of claim 1 wherein the reacting further comprises milling the metal fluoride material with the metal complex.

3. The composition of claim 1 comprising a particle with a grain size greater than 100 nm.

4. The composition of claim 1 comprising a particle with a grain size greater than 130 nm.

5. The composition of claim 1 wherein the particle has a first phase and the coating has a second phase.

6. The composition of claim 5 wherein the first phase comprises $CuF_2$.

7. The composition of claim 5 wherein the second phase comprises a material formed from the decomposition of the metal complex.

8. The composition of claim 1 wherein the metal complex comprises NiO.

9. The composition of claim 1 wherein the coating is covalently bonded to the particle.

10. The composition of claim 1 wherein the heat treatment is performed at a temperature less than 450 degrees C.

11. The composition of claim 1 wherein the heat treatment is performed at a temperature less than 325 degrees C.

12. A composition comprising:
    a particle comprising $CuF_2$; and
    a surface coating on the particle, wherein the coating comprises a material represented by a formula (1):

$$Cu_a Ni_b O_c F_d \qquad (1)$$

where $0 < a \le 1$, $0 < b \le 1$, $0 \le c \le 1$, and $0 \le d \le 1$:
    wherein the composition has rechargeable capacity.

* * * * *